US012749382B2

(12) United States Patent
Peters et al.

(10) Patent No.: US 12,749,382 B2
(45) Date of Patent: *Sep. 29, 2026

(54) SYSTEMS AND METHODS TO PROVIDE A PORTABLE ALERT DEVICE

(71) Applicant: Birdie Love Inc., Berkeley, CA (US)

(72) Inventors: Alison Peters, Los Angeles, CA (US); Amy Ferber, Berkeley, CA (US)

(73) Assignee: Birdie Love Inc., Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/895,792

(22) Filed: Sep. 25, 2024

(65) Prior Publication Data

US 2025/0014434 A1 Jan. 9, 2025

Related U.S. Application Data

(63) Continuation of application No. 18/485,586, filed on Oct. 12, 2023, now Pat. No. 12,118,877, which is a continuation of application No. 18/180,478, filed on Mar. 8, 2023, now Pat. No. 11,790,738, which is a continuation of application No. 17/874,964, filed on Jul. 27, 2022, now Pat. No. 11,610,458, which is a continuation of application No. 17/695,749, filed on Mar. 15, 2022, now Pat. No. 11,443,599.

(51) Int. Cl.
*G08B 3/10* (2006.01)
*G08B 21/02* (2006.01)

(52) U.S. Cl.
CPC .......... *G08B 3/1016* (2013.01); *G08B 21/02* (2013.01)

(58) Field of Classification Search
None
See application file for complete search history.

(56) References Cited

U.S. PATENT DOCUMENTS

| | | | | |
|---|---|---|---|---|
| 10,096,232 | B1 * | 10/2018 | Basu | G08B 13/1427 |
| 11,790,738 | B2 * | 10/2023 | Peters | G08B 3/1016 340/384.7 |
| 2013/0271264 | A1 * | 10/2013 | Page | G08B 21/0297 340/6.1 |
| 2016/0180697 | A1 | 6/2016 | Ros | |
| 2016/0260958 | A1 * | 9/2016 | Weir | A61M 5/00 |
| 2019/0272733 | A1 | 9/2019 | King | |

FOREIGN PATENT DOCUMENTS

| | | |
|---|---|---|
| CN | 201084240 Y | 7/2008 |
| KR | 20200100416 | 8/2020 |

* cited by examiner

*Primary Examiner* — Thomas S McCormack
(74) *Attorney, Agent, or Firm* — Esplin & Associates, PC

(57) ABSTRACT

Systems and methods to provide a portable alert device are disclosed herein. The system may include a key component that includes a connector extending from a first side and a base component. The key component is shaped with a first indent and a second indent on opposite sides. The base component includes: a back piece shaped with a first ledge and a second ledge opposite the first ledge that extend out of an interior of the back piece; a front piece that joins with the back piece to enclose a portion of the key component so that the first ledge is positioned within the first indent and the second ledge is positioned with the second indent, the first ledge within the first indent and the second ledge within the second indent prevent the key component from entirely disengaging with the base component; a transceiver; and alert components.

20 Claims, 6 Drawing Sheets

SYSTEMS AND METHODS TO PROVIDE A PORTABLE ALERT DEVICE

FIELD OF THE DISCLOSURE

The present disclosure relates to systems and methods configured to provide a portable alert device.

BACKGROUND

Individuals often carry personal protection (e.g., mace, pepper spray, pocketknife) in unsafe circumstances. In such unsafe circumstances, the individuals may desire to activate an audible and/or visual alarm as a deterrent to a threat and/or to draw attention of bystanders. Alternatively, the individuals may desire to discretely alert others of their unsafe circumstances and/or to receive communications to confirm or unconfirm their safety.

SUMMARY

One aspect of the present disclosure relates to a portable alert device. The system may be in the form of a keychain or otherwise portable device comprising of two components, a key component and a base component, that may partially engage and disengage and/or effectuate communication alerts. Upon partial disengagement of the two components (i.e., intentionally by a user) an audible alarm may be activated. Conversely, the audible alarm may be deactivated upon engagement of the two components. Additionally, upon selections of a button on the base component, communication alerts may be effectuated such that the communication alerts are provided to a user of the portable alert device and/or user-specified correspondences of the user. Therefore, losing and/or breaking structural elements of the key component and/or the base component may be eliminated. Furthermore, the user of the portable alert device may be able to communicate with other people (e.g., friends, emergency services) to ensure their own safety.

The key component may include a connector and/or other components. The connector may extend out of a center of a first side of the key component. The connector may be bare metal or other material. A second side of the key component may be shaped with a first indent in a first portion of the key component. A third side of the key component may be shaped with a second indent in the first portion. The first indent may be opposite the second indent.

The base component may include a back piece, a front piece, a transceiver, alert components, and/or other components. The back piece may be shaped with a first ledge and a second ledge that extend out of an interior surface near a fourth side of the base component. The second ledge may be opposite the first ledge.

The front piece may join with the back piece to enclose the first portion of the key component. As such, the first ledge may be positioned within the first indent and the second ledge may be positioned with the second indent. Thus, an outward movement of the key component from the base component may be permitted while the first ledge within the first indent and the second ledge within the second indent prevent the key component from entirely disengaging with the base component.

The transceiver may be connected to the alert components. The connection may wirelessly link the alert components to a mobile smart device associated with a user of the portable alert device to enable management of the alert components with a mobile application.

The alert components may include an audible alarm and a button connected to the transceiver. Different selection combinations of the button may be defined via the mobile application by the user to cause different communication alerts. The connector may engage with the alert components so that responsive to the connector being disengaged from the alert components, the audible alarm is activated, and responsive to the connector being engaged with the alert components, the audible alarm is deactivated.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
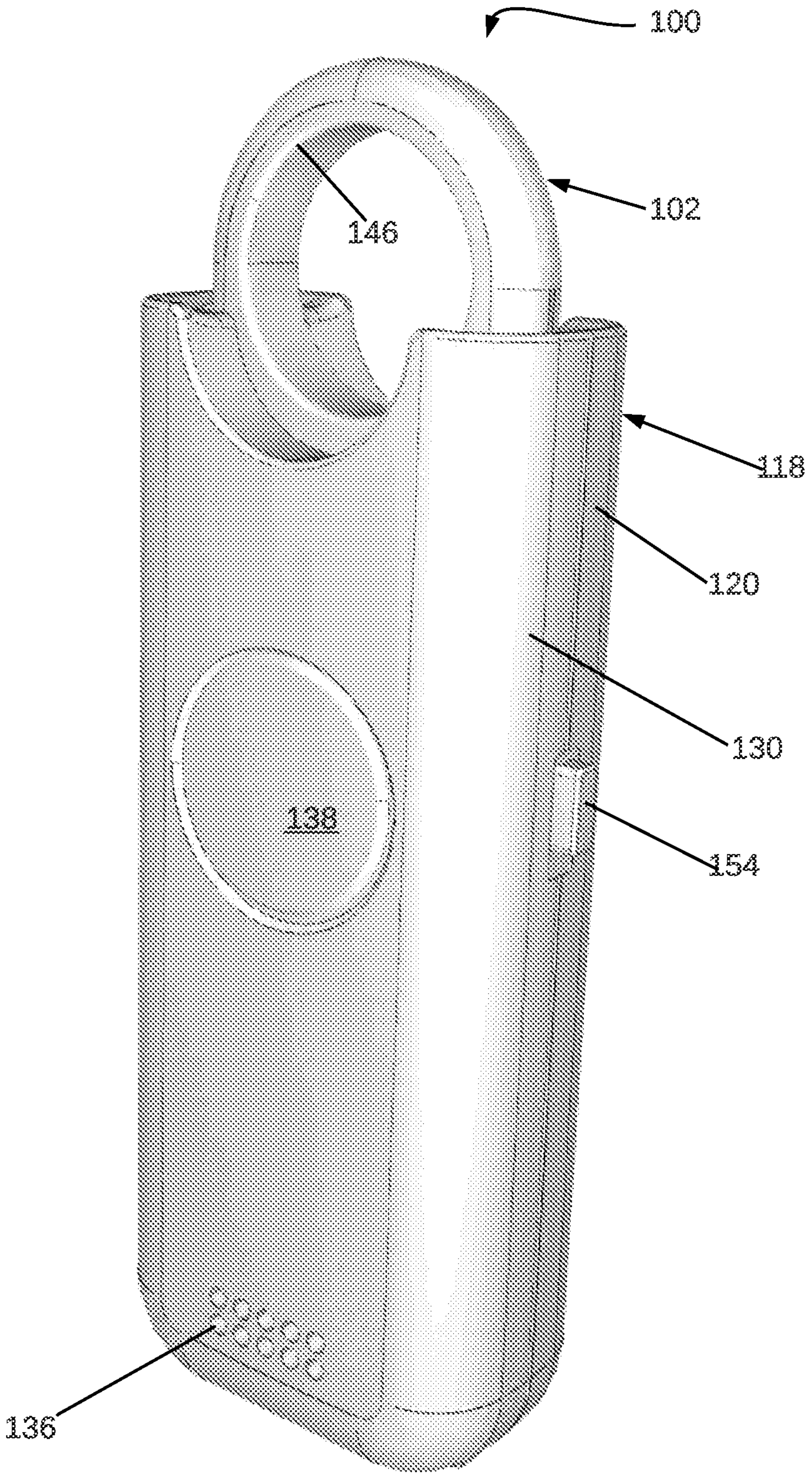
FIG. 1 illustrates a key component and a base component comprising a portable alert device, in accordance with one or more implementations.

FIG. 1 illustrates a front view portable alert device 100 configured to provide a portable alert device, in accordance with one or more implementations. In some implementations, portable alert device 100 may be configured of one or more of type of plastic, silicon, metal, and/or other materials. Portable alert device 100 may include a key component 102, a base component 118, and/or other components. Key component 102 may include an annular opening 146. In some implementations, opening 146 may be a square-shaped or other shaped opening. Opening 146 may enable finger(s) of a user of portable alert device 100 to join with key component 102. In some implementations, a keychain ring (not pictured) may be attached to portable alert device 100 via opening 146 to facilitate attachment of portable alert device 100 to one or more keys, lanyards, and/or other items.

Base component 118 may include a back piece 120, a front piece 130, a transceiver 132 (see, FIG. 4A), alert components 134, a removeable battery door 156 (see, FIG. 2), a power switch 154, and/or other components. Portable alert device 100 and its functionalities described herein may be battery-powered. Removeable battery door 156 may enable the user to change one or more batteries that power portable alert device 100. In some implementations, the one or more batteries may be rechargeable via a port (not pictured) on base component 118.

Alert components 134 may include an audible alarm 136, a button 138 connected to transceiver 132, a light (not pictured), and/or other alert components. In some implementations, alert components 134 may deter a threat and/or draw attention to portable alert device 100. In some implementations, the light may be an LED light and/or other bright light. Audible alarm 136 may be unpleasant, loud, high pitched, repetitive, and/or other characteristics. In some implementations, audible alarm 136 may be greater than about 120 decibels, 130 decibels, 140 decibels; may be less than about 120 decibels, 130 decibels, 140 decibels; and/or may be within a range bounded at the upper end by any loudness of sound in the former listing of loudness of sound and bounded at the lower end by any loudness of sound in the latter listing of loudness of sound.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of +2 decibels of the given numeric value provided such a deviation does not alter the end function or result of the value. Therefore, a value of about 130 decibels can be construed to be a range from 128 decibels to 132 decibels. Furthermore, a range may be construed to include the start and the end of the range. For example, a range of 120 decibels to 140 decibels (i.e., range of 120-140 decibels) includes 120 decibels and also includes 140 decibels, as well as decibels in between 120 decibels and 140 decibels, unless explicitly stated otherwise herein.

Figure 3:
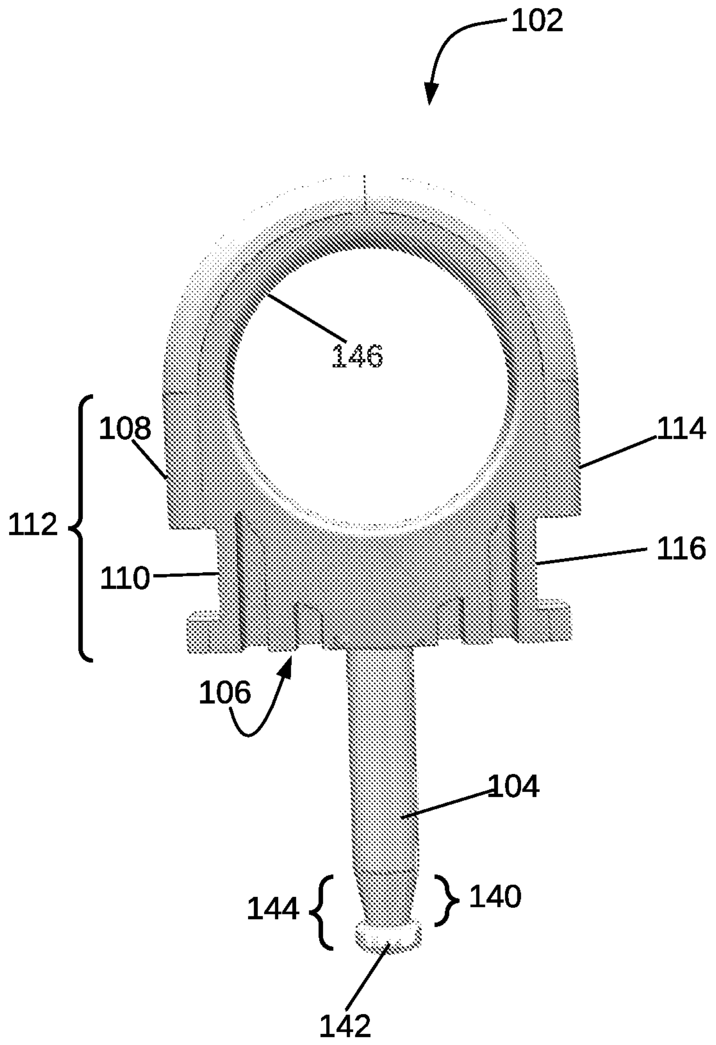
FIG. 3 illustrates the key component, in accordance with one or more implementations.

FIG. 3 illustrates key component 102. Key component 102 may include a connector 104 and/or other components. Connector 104 may extend out a center of a first side 106 of key component 102. Connector 104 may be bare metal and/or other materials. A second side 108 of the key component 102 may be shaped with a first indent 110 in a first portion 112 of the key component 102. A third side 114 of the key component 102 may be shaped with a second indent 116 in first portion 112. First indent 110 may be opposite second indent 116. First indent 110 and second indent 116 may be rectangular, rounded, and/or be other shaped indents. In some implementations, first portion 112 of key component 102 may include a portion of the opening 146. That is, some of opening 146 is considered to be in first portion 112.

In some implementations, length of connector 104 may be about 10 millimeters, 11 millimeters, 11.5 millimeters; may be less than about 10 millimeters, 11 millimeters, 11.5 millimeters; and/or may be within a range bounded at the upper end by a length in the former listing of lengths and bounded at the lower end by any length in the latter listing of lengths. In some implementations, connector 104 may be cylindrical, square-shaped, triangular, and/or other shapes at the length. Connector 104 may include an end portion 144 that is furthest from key component 102, particularly first side 106, from which connector 104 extends. End portion 144 may include a tapered section 140 and a rim 142. Rim 142 may be attached to tapered section 140 so that rim 142 is the furthest point from first side 106.

Figure 4A:
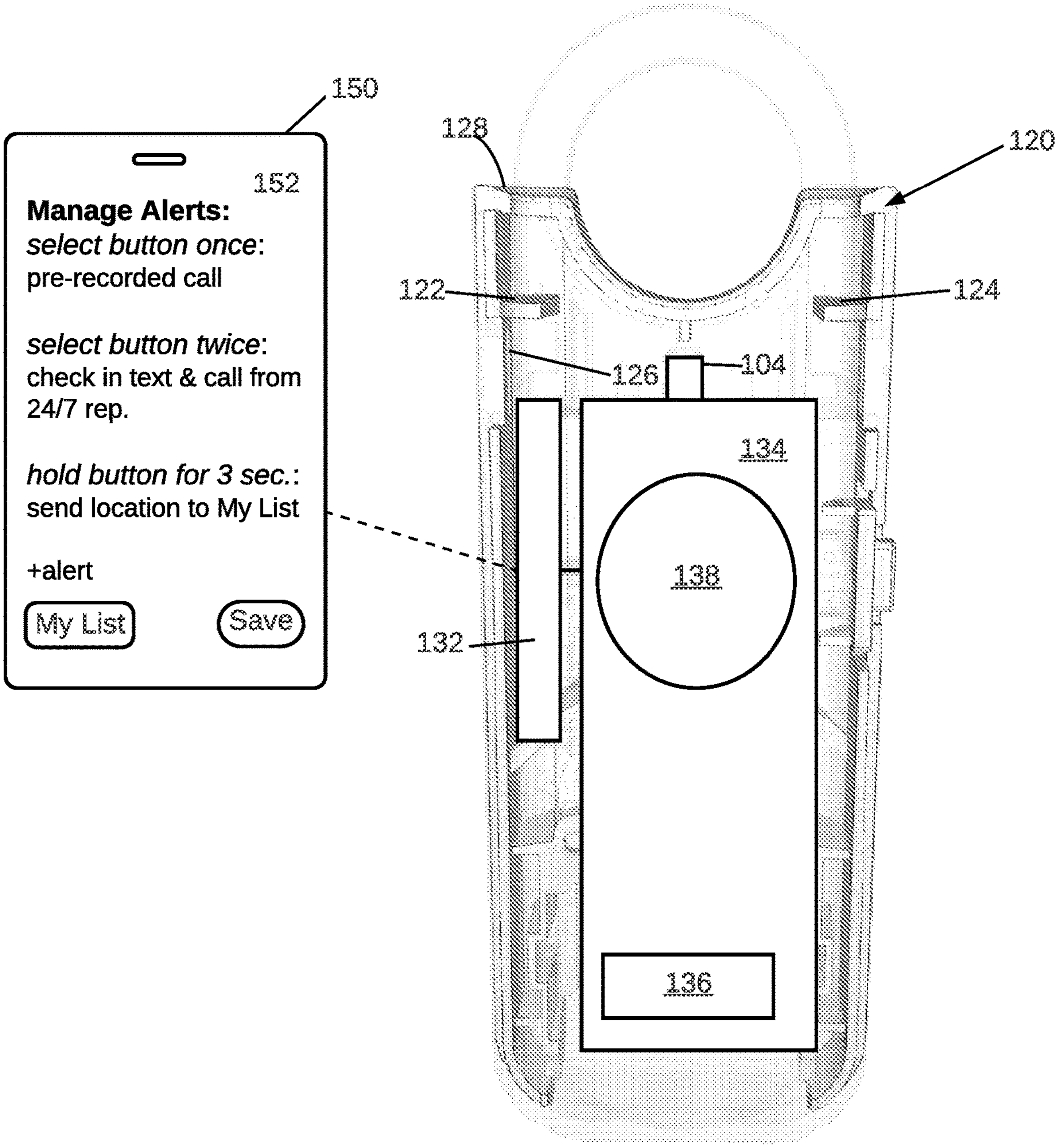
FIG. 4A illustrates an interior of the base component, in accordance with one or more implementations.
Figure 4B:
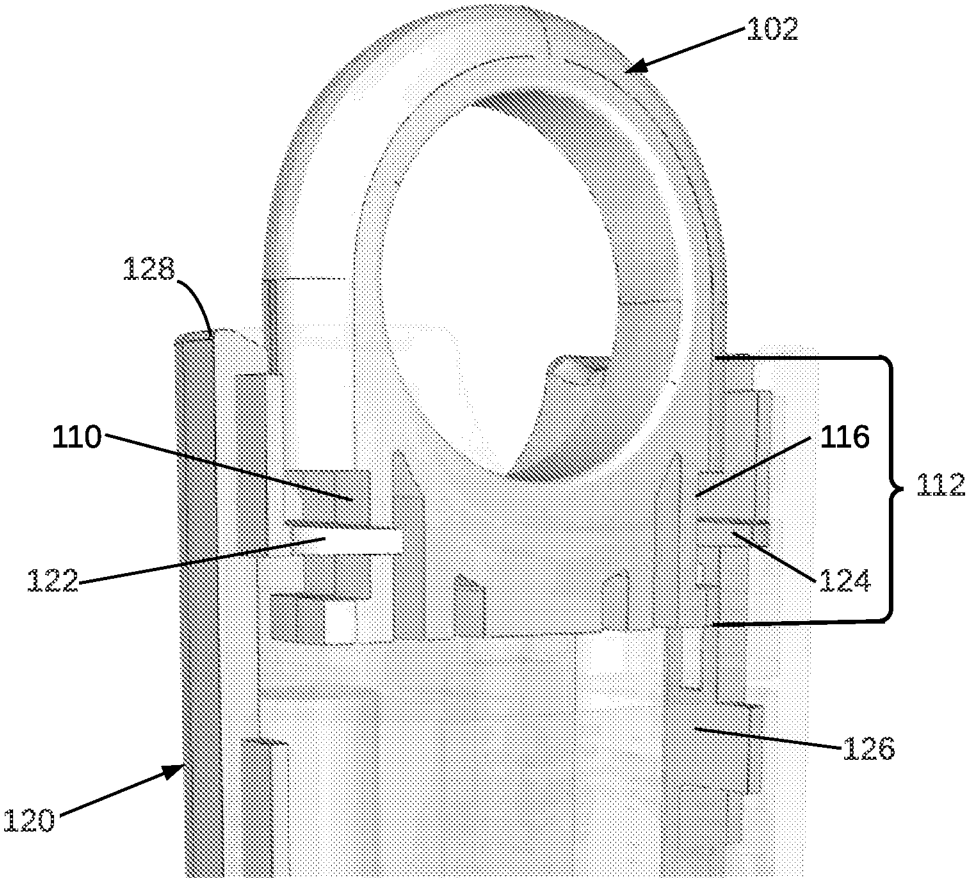
FIG. 4B illustrates a back piece of the base component and the key component, in accordance with one or more implementations.

FIG. 4A illustrates back piece 120 of base component 118 described in FIG. 1. FIG. 4B illustrates back piece 120, partially, and key component 102. Referring to FIGS. 4A and 4B, back piece 120 may be shaped with a first ledge 122 and a second ledge 124 that extend out of an interior surface 126 near a fourth side 128 of back piece 120 and thus base component 118. Second ledge 124 may be opposite the first ledge 122. Referring to FIG. 4B, first ledge 122 may be positioned within first indent 110 and second ledge 124 may be positioned within second indent 116. In some implementations, first ledge 122 may be flush against first indent 110, and second ledge 124 may be flush against second indent 116. In some implementations, first ledge 122 and second ledge 124 may be rounded, squared, triangular, and/or other shaped ledges that enable a shape of first indent 110 and second indent 116, respectively, of key component 102 to prevent key component 102 from entirely disengaging from base component 118.

Figure 2:
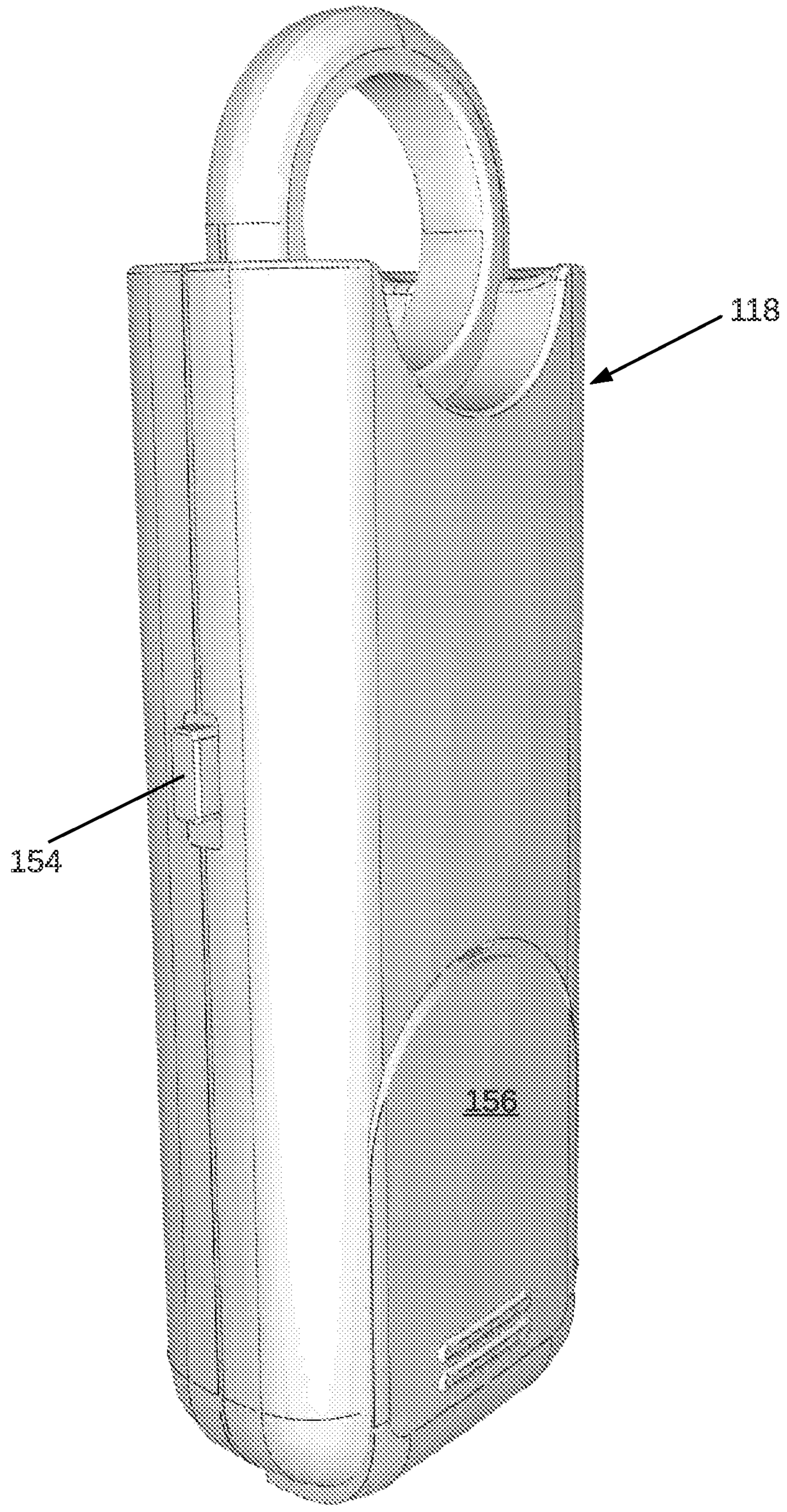
FIG. 2 illustrates a back view of the portable alert device, in accordance with one or more implementations.

Front piece 130 (see, FIG. 1) may join with back piece 120 to enclose first portion 112 (see, FIG. 3) of key component 102 as illustrated in FIG. 1-2. As such, first portion 112 may be between back piece 120 and front piece 130 and enclosed by such. An outward movement of key component 102 away from base component 118 may be permitted while first ledge 122 within first indent 110 and second ledge 124 within second indent 116 prevent key component 102 from entirely disengaging with base component 118. An entirely disengaged key component 102 from base component 118 may refer to key component 102 physically separating from base component 118.

Referring to FIG. 4A, connector 104 may engage with alert components 134 so that responsive to connector 104 being disengaged from alert components 134, audible alarm 136 is activated, and responsive to connector 104 being engaged with alert components 134, the audible alarm 136 is deactivated. In some implementations, connector 104 may particularly engage with a first alert component (not pictured) included in alert components 134.

The deactivated alarm may refer to an absence of audible alarm 136, the light, communication alerts, and/or other alerts so that portable alert device 100 is in an idle mode. Responsive to connector 104 being disengaged from alert components 134 (e.g., by a user), audible alarm 136 may be activated. Conversely, responsive to connector 104 being engaged with alert components 134, audible alarm 136, the light, communication alerts, and/or other alerts may be deactivated. Connector 104 may be disengaged from alert components 134 by the user pulling key component 102 and base component 118 in opposite directions or by the user pulling key component 102 outward from base component 118. Upon such pulling or outward movement, key component 102 and base component 118 may not entirely detach from each other due to first ledge 122 positioned within first indent 110 and second ledge 124 positioned within second ledge 116, and first ledge 122 and second ledge 124 colliding with first indent 110 and the second indent 116, respectively (see, FIG. 4A-B). Connector 104 may be engaged with alert components 134 by the user pushing key component 102 and base component 118 towards each other to secure key component 102 to base component 118. In some implementations, a click sound may be caused upon engagement of connector 104 with alert component 134.

Referring to FIG. 2, power switch 154 may be connected to audible alarm 136 described in FIG. 1 and FIG. 4A. Power switch 154 may enable function of audible alarm 136 upon disengagement and engagement of connector 104 from alert components 134, as described herein. That is, upon power switch 154 being in an on-position, audible alarm 136 may be effectuated upon disengagement of connector 104 from alert components 134. Conversely, upon power switch 154 being in an off-position, audible alarm 136 may not be effectuated upon disengagement of connector 104 from alert components 134. In some implementations, upon effectuation of audible alarm 136 responsive to the disengagement, a change of power switch 154 from the on-position to the off-position may immediately deactivate audible alarm 136.

Referring to FIG. 4A, transceiver 132 may be connected to alert components 134. The connection may wirelessly link alert components 134 to a mobile smart device 150 associated with the user of portable alert device 100. The wireless linkage may enable management of alert components 134 with a mobile application 152. In some implementations, alert components 134 may discretely cause different communication alerts on behalf of the user and/or to the user. Different selection combinations of button 138 and/or the disengagement of key component 102 from base component 118 (see, FIG. 1) may be defined via mobile application 152 by the user to cause the different communication alerts.

The different communication alerts may include placement of a prerecorded call to mobile smart device 150, communication (e.g., text or automated call) to another mobile smart device associated with a person (defined by the user) to initiate communication with the user via their mobile smart device 150 (e.g., call them), transmission of a text message and/or call from external resource(s) to mobile smart device 150, transmission of a location of mobile smart device 150 to one or more other mobile smart devices, and/or other communication alerts. External resource(s) may include an emergency service, the police, and/or other external resources. The one or more other mobile smart devices may be associated with people that the user defined via the mobile application. For example, the one or more other mobile smart devices may be associated with one or more of a friend, a family member, a spouse, a partner, and/or other people. A list saved via mobile application 152 may include the people defined by the user, phone numbers to the respective one or more mobile smart devices, whether to call or text them, a priority of the people, a wait time, and/or other information (e.g., My list in FIG. 4A). The wait time may be a length of time to transpire before the next person on the list is contacted. The list may be stored to electronic storage (not pictured) managed by mobile application 152, electronic storage (not pictured) of mobile smart device 150, and/or other storage.

Individual ones of the communication alerts may be responsive to various individual selection combinations of button 138 or the disengagement of key component 102 from base component 118. The selection combinations may include selecting button 138 once, selecting button 138 twice, selecting button 138 a particular number of times, holding down button 138 for a particular amount of time, and/or other selection combinations.

For example, the placement of the prerecorded call to mobile smart device 150 may be caused in response to a first selection combination of button 138 (e.g., select button 138 once). As another example, one or more people from the list may be transmitted a text message or an automated call to call the user on their mobile smart device 150 responsive to a second selection combination of button 138 (e.g., select button 138 twice). As another example, the transmission of the text message may be caused in response to a third selection combination of button 138 (e.g., a long hold of button 138). As another example, the transmission of the location may be caused in response to a fourth selection combination of button 138 (e.g., 5 or more rapid selections of button 138).

Figure 5:
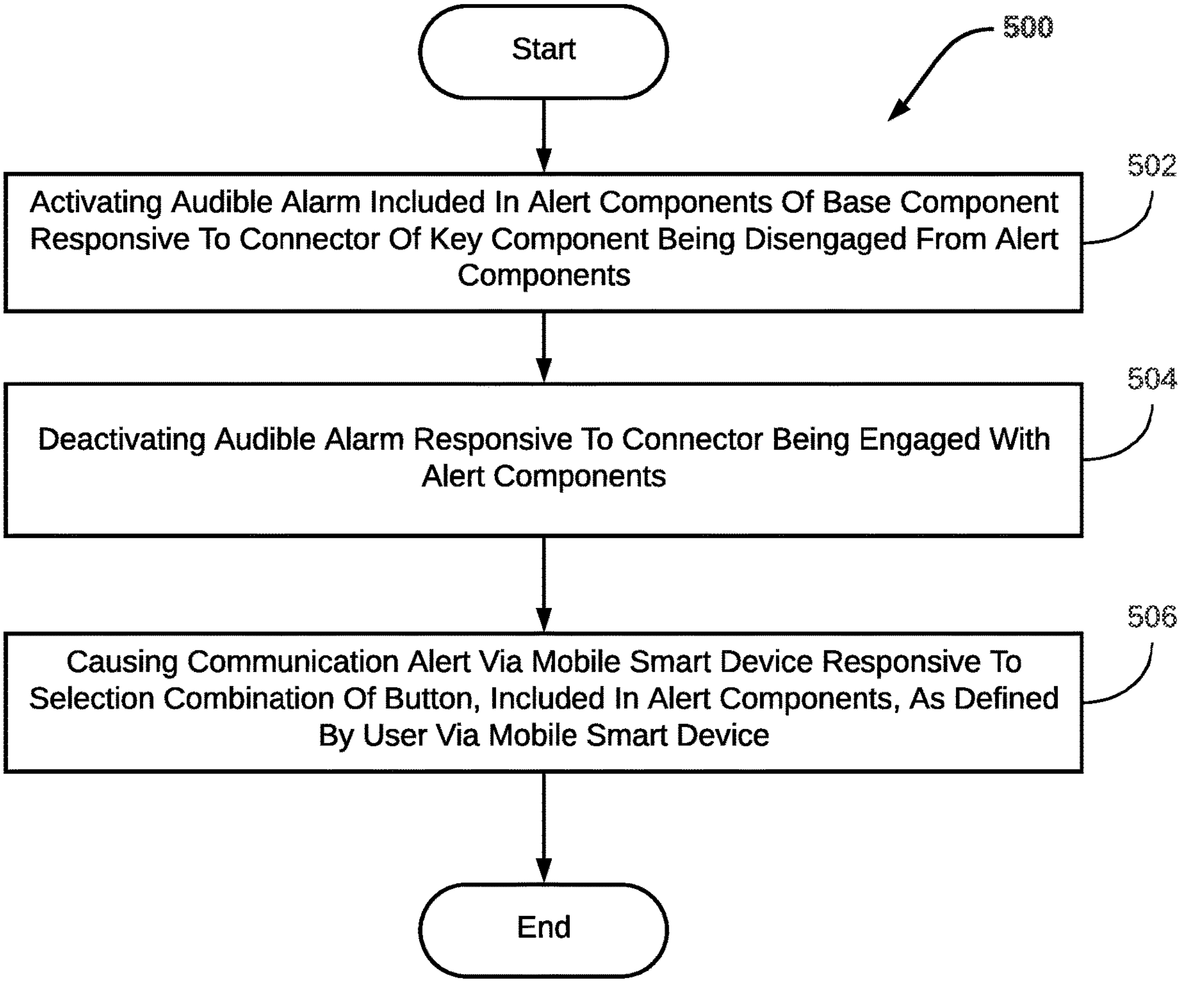
FIG. 5 illustrates a method to provide alerts via a portable alert device, in accordance with one or more implementations.

FIG. 5 illustrates a method 500 to provide alerts via a portable alert device, in accordance with one or more implementations. The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

An operation 502 may include activating an audible alarm included in alert components of a base component responsive to a connector of a key component being disengaged from the alert components (e.g., by a user). The connector may extend out a center of a first side of the key component (See, descriptions for connector 104 and first side 106 of key component 102 as referenced in FIG. 1-4). The key component may be shaped with a first indent on a second side of the key component and a second indent on a third side of the key component opposite the second side (See, descriptions for first indent 110 on second side 108 and second indent 116 on third side 114 of key component 102 and/or other components as referenced in FIG. 1-4). The base component may include a back piece shaped with a first ledge that is positioned within the first indent and a second ledge that is positioned within the second indent to prevent the key component from entirely disengaging with the base component when the back piece joined with a front piece encloses part of the key component.

An operation 504 may include deactivating the audible alarm responsive to the connector being engaged with the alert components (e.g., by the user). The audible alarm may be idle or otherwise silent when the connector is engaged with the alert components. See, descriptions for alert component 134 and audible alarm 136 of base component 118 and/or other components as referenced in FIG. 1-4.

An operation 506 may include causing a communication alert via a mobile smart device responsive to a selection combination of a button as defined by the user via the mobile smart device. The button may be included in the alert components. The communication alert responsive to the selection combination may be defined with a mobile application via the mobile smart device. See, descriptions for alert component 134 and button 138 of base component 118 and/or other components as referenced in FIG. 1-4.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A portable alert device, the portable alert device comprising:

a key component including a connector, wherein the key component forms a first opening that facilitates a grip of the key component by a user, wherein the connector extends out of a first side of the key component; and a base component with a first end and a second end opposite the first end, wherein the first end is formed with a cavity opening into a cavity of the base component, wherein an interior surface of the cavity is formed to permit the key component to partially withdraw from the cavity through the cavity opening and prevent the key component from entirely withdrawing from the cavity of the base component, the base component housing:

a transceiver connected to alert components, and the alert components including an audible alarm and a button connected to the transceiver, wherein selection of the button effectuates communication alerts to one or more recipients, wherein the connector engages with the alert components so that:

responsive to the connector being disengaged from the alert components, the audible alarm is activated, responsive to the connector being engaged with the alert components, the audible alarm is deactivated.

2. The portable alert device of claim 1, wherein the connector is 11 millimeters in length.

3. The portable alert device of claim 1, wherein the connector includes an end portion that is furthest from the key component, wherein the end portion is formed with a tapered section and a rim that is attached to the tapered section.

4. The portable alert device of claim 1, wherein the connector is cylindrical.

5. The portable alert device of claim 1, wherein the opening of the key component is circular.

6. The portable alert device of claim 1, wherein the alert components are battery powered, and wherein a back piece includes a removeable battery door.

7. The portable alert device of claim 1, wherein the audible alarm is 130 decibels.

8. The portable alert device of claim 1, wherein the communication alerts include placement of a prerecorded call to a mobile smart device associated with the user of the portable alert device, transmission of a first text message from an external resource to the mobile smart device and a second text message from the external resource to mobile devices associated with the one or more recipients, and transmission of a location of the mobile smart device to one or more of the mobile devices associated with the one or more recipients.

9. The portable alert device of claim 1, wherein different selection combinations of the button effectuate different communication alerts, wherein the different selection combinations include a single selection of the button, two consecutive selections of the button, and holding down the button for a particular amount of time.

10. The portable alert device of claim 1, further comprising a power switch connected to the audible alarm that enables function of the audible alarm upon disengagement and engagement of the connector from the alert components.

11. A method for providing alerts via a portable alert device, the method comprising:

responsive to a connector included in a key component being disengaged from alert components housed in a base component, activating an audible alarm included in the base component, wherein the connector is engaged with the alert components to enable such disengagement, wherein the key component forms a first opening that facilitates a grip of the key component by a user, wherein the connector extends out of a first side of the key component, wherein:

the base component includes a first end and a second end opposite the first end, wherein the first end is formed with a cavity opening into a cavity of the base component, wherein an interior surface of the cavity is formed to permit the key component to partially withdraw from the cavity through the cavity opening and prevent the key component from entirely withdrawing from the cavity of the base component, a transceiver housed by the base component is connected to the alert components, and the alert components including the audible alarm and a button connected to the transceiver, wherein selection of the button effectuates communication alerts to one or more recipients; and responsive to the connector being engaged with the alert components, deactivating the audible alarm.

12. The method of claim 11, wherein the connector is 11 millimeters in length.

13. The method of claim 11, wherein the connector includes an end portion that is furthest from the key component, wherein the end portion is formed with a tapered section and a rim that is attached to the tapered section.

14. The method of claim 11, wherein the connector is cylindrical.

15. The method of claim 11, wherein the opening of the key component is circular.

16. The method of claim 11, wherein the alert components are battery powered, and wherein a back piece includes a removeable battery door.

17. The method of claim 11, wherein the audible alarm is 130 decibels.

18. The method of claim 11, wherein the communication alerts include placement of a prerecorded call to a mobile smart device associated with the user of the portable alert device, transmission of a first text message from an external resource to the mobile smart device and a second text message from the external resource to mobile devices associated with the one or more recipients, and transmission of a location of the mobile smart device to one or more of the mobile devices associated with the one or more recipients.

19. The method of claim 11, wherein different selection combinations of the button effectuate different communication alerts, wherein the different selection combinations include a single selection of the button, two consecutive selections of the button, and holding down the button for a particular amount of time.

20. The method of claim 11, wherein the base component further comprises a power switch connected to the audible alarm that enables function of the audible alarm upon disengagement and engagement of the connector from the alert components.

* * * * *